(12) United States Patent
Fitzmaurice et al.

(10) Patent No.: US 9,405,404 B2
(45) Date of Patent: Aug. 2, 2016

(54) MULTI-TOUCH MARKING MENUS AND DIRECTIONAL CHORDING GESTURES

(75) Inventors: George Fitzmaurice, Toronto (CA); Tovi Grossman, Toronto (CA); Gerard Julian Lepinski, Markham (CA)

(73) Assignee: AUTODESK, INC., San Rafael, CA (US)

(*) Notice: Subject to any disclaimer, the term of this patent is extended or adjusted under 35 U.S.C. 154(b) by 296 days.

(21) Appl. No.: 12/732,978

(22) Filed: Mar. 26, 2010

(65) Prior Publication Data

US 2011/0234503 A1 Sep. 29, 2011

(51) Int. Cl.
| | |
|---|---|
| G06F 3/041 | (2006.01) |
| G06F 3/042 | (2006.01) |
| G06F 3/023 | (2006.01) |
| G06F 3/0488 | (2013.01) |

(52) U.S. Cl.
CPC .............. *G06F 3/042* (2013.01); *G06F 3/0235* (2013.01); *G06F 3/0425* (2013.01); *G06F 3/04883* (2013.01); *G06F 2203/04808* (2013.01)

(58) Field of Classification Search
CPC .................. G06F 3/0235; G06F 3/042; G06F 2203/04808; G06F 3/04883; G06F 3/0425
USPC ......................................................... 345/173
See application file for complete search history.

(56) References Cited

U.S. PATENT DOCUMENTS

| 7,489,308 | B2 | 2/2009 | Blake et al. | |
|---|---|---|---|---|
| 2004/0160427 | A1* | 8/2004 | Keely et al. | 345/179 |
| 2005/0166163 | A1 | 7/2005 | Chang et al. | |
| 2005/0198592 | A1 | 9/2005 | Keely, Jr. et al. | |
| 2007/0269776 | A1 | 11/2007 | Fux et al. | |
| 2008/0029691 | A1 | 2/2008 | Han | |
| 2008/0163130 | A1 | 7/2008 | Westerman | |
| 2009/0021489 | A1* | 1/2009 | Westerman et al. | 345/173 |
| 2009/0179867 | A1* | 7/2009 | Shim et al. | 345/173 |
| 2009/0219253 | A1* | 9/2009 | Izadi et al. | 345/173 |
| 2009/0251438 | A1 | 10/2009 | Westerman et al. | |
| 2009/0256817 | A1 | 10/2009 | Perlin et al. | |
| 2010/0087230 | A1* | 4/2010 | Peh et al. | 455/566 |
| 2010/0229090 | A1* | 9/2010 | Newton et al. | 715/702 |
| 2010/0235793 | A1* | 9/2010 | Ording et al. | 715/863 |
| 2010/0313125 | A1* | 12/2010 | Fleizach et al. | 715/702 |

FOREIGN PATENT DOCUMENTS

| CN | 1521688 A | 8/2004 |
|---|---|---|
| CN | 101410781 A | 4/2009 |

(Continued)

OTHER PUBLICATIONS

Apple iPhone User's Guide, iPhone Released on Jun. 29 (2007).

(Continued)

*Primary Examiner* — Charles V Hicks
(74) *Attorney, Agent, or Firm* — Artegis Law Group, LLP

(57) ABSTRACT

A method for interacting with a multi-touch surface to perform an operation. The method includes detecting that at least one finger is in contact with the multi-touch surface, identifying a chord defined by a combination of fingers associated with the at least one finger in contact with the multi-touch surface, and performing a first function associated with the operation based on the chord. The method may also include integrating the chords into directional movement gestures and using the gestures to control system functionality.

21 Claims, 11 Drawing Sheets

(56) References Cited

FOREIGN PATENT DOCUMENTS

| | | | |
|---|---|---|---|
| CN | 102007465 A | 4/2011 | |
| EP | 2020633 A1 | 2/2009 | |
| KR | 100923755 A1 | 10/2009 | |
| WO | W09938149 A1 | 7/1999 | |
| WO | 2007089766 A2 | 8/2007 | |

OTHER PUBLICATIONS

Bailly, at al. "Flower Menus: A New Type of Marking Menu With Large Menu Breadth, Within Groups and Efficient Expert Mode Memorization," ACM AVI., pp. 15-22 (2008).

Bau, et al. "OctoPocus: A Dynamic Guide for Learning Gesture-Based Command Sets," ACM UIST, pp. 37-46 (2008).

Benko, et al. "Precise Selection Techniques for Multi-Touch Screens," ACM CHI., pp. 1263-1272 (2006).

Brandl, et al. "Combining and Measuring the Benefits of Bimanual Pen and Direct-Touch Interaction on Horizontal Interfaces," ACM AVI., pp. 154-161 (2008).

Brandl, et al. "Occlusion-Aware Menu Design for Digital Tabletops," ACM CHI Interactivity, pp. 3223-3228 (2009).

Card, et al. "User Perceptual Mechanisms in the Search of Computer Command Menus," ACM CHI., pp. 190-196 (1982).

Davidson, et al. "Extending 2D Object Arrangement With Pressure-Sensitive Layering Cues," ACM UIST., pp. 87-90 (2008).

Dietz, et al. "DiamondTouch: A Multi-User Touch Technology," ACM UIST., pp. 219-226 (2001).

Esenther, et al. "Fluid DTMouse: Better Mouse Support for Touch-Based Interactions," AVI., pp. 112-115 (2006).

Fingerworks, Inc. "Mouse Emulation Gesture Guide," available at http://www.fingerworks.com/gesture_guide_mouse.html (2008).

Han, et al. "Low-Cost Multi-Touch Sensing Through Frustrated Total Internal Reflection," ACM UIST., pp. 115-118 (2005).

Cob, et al. "Reality-Based Interaction: A Framework for Post-WIMP Interfaces," ACM CHI., pp. 201-210 (2008).

Kurtenbach, et al. "The Limits of Expert Performance Using Hierarchic Marking Menus," ACM Interact/CHI., pp. 482-487 (1993).

Kurtenbach, et al. "An Empirical Evaluation of Some Articulatory and Cognitive Aspects of Marking Menus," Journal of Human Computer Interaction, 8(1):1-23 (1993).

Kurtenbach, et al. "The Hotbox: Efficient Access to a Large Number of Menu-Items," ACM CHI., pp. 231-237 (1999).

Lenman, et al. "Using Marking Menus to Develop Command Sets for Computer Vision Based Hand Gesture Interfaces," ACM NORDCHI., pp. 239-242 (2002).

Li, et al. "Experimental Analysis of Mode Switching Techniques in Pen-Based User Interfaces," ACM CHI., pp. 461-470 (2005).

Lyons, et al. "Experimental Evaluations of the Twiddler One-Handed Chording Mobile Keyboard," Human-Computer Interaction, 21(4):343-392 (2006).

Malik, et al. "Interacting With Large Displays From a Distance With Vision-Tracked Multi-Finger Gestural Input," ACM UIST., pp. 43-52 (2005).

Matejka, et al. "The Design and Evaluation of Multi-Finger Mouse Emulation Techniques," ACM CHI., pp. 1073-1082 (2009).

Potter, et al. "Improving the Accuracy of Touch Screens: An Experimental Evaluation of Three Strategies," ACM CHI., pp. 27-32 (1988).

Rekimoto, et al. "SmartSkin: An Infrastructure for Freehand Manipulation on Interactive Surfaces," ACM CHI., pp. 113-120 (2002).

Rosenberg, et al. "IMPAD: An Inexpensive Multi-Touch Pressure Acquisition Device," ACM CHI EA, pp. 3217-3222 (2009).

Scott, et al. "Territoriality in Collaborative Tabletop Workspaces," Computer Supported Cooperative Work, pp. 294-303 (2004).

Shen, et al. "DiamondSpin: An Extensible Toolkit for Around-The-Table Interaction," ACM CHI., pp. 167-174 (2004).

Vogel, et al. "Shift: A Technique for Operating Pen-Based Interfaces Using Touch," ACM CHI., pp. 657-666 (2007).

Wang, et al. "Detecting and Leveraging Finger Orientation for Interaction With Direct-Touch Surfaces," ACM UIST. (2009).

Wigdor, et al. "A Comparison of Consecutive and Concurrent Input Text Entry Techniques for Mobile Phones," ACM CHI., pp. 81-88 (2004).

Wigdor, et al. "Designing User Interfaces for Multi-Touch and Gesture Devices," ACM CHI., pp. 2755-2758 (2009).

Wilson, et al. ‹ PlayAnywhere: A Compact Tabletop Computer Vision System, ACM UIST., pp. 83-92 (2005).

Wobbrock, et al. "User-Defined Gestures for Surface Computing," ACM CHI., pp. 1083-1092 (2009).

Wu, et al. "Multi-Finger and Whole Hand Gestural Interaction Techniques for Multi-User Tabletop Displays," ACM UIST., pp. 193-202 (2003).

Zhao, et al. "Simple vs. Compound Mark Hierarchical Marking Menus," ACM UIST., pp. 33-42 (2004).

Zhao, et al. "Zone and Polygon Menus: Using Relative Position to Increase the Breadth of Multi-Stroke Marking Menus," ACM CHI., pp. 1077-1086 (2006).

Patent Cooperation Treaty International Search Report, Ser. No. PCT/US 11/30024, dated May 31, 2011.

Patent Cooperation Treaty Written Opinion of the International Searching Authority, Ser. No. PCT/US 11/30024, dated May 31, 2011.

Extended European Search Report for Application No. 11760325.8 dated Feb. 17, 2015.

* cited by examiner

MULTI-TOUCH MARKING MENUS AND DIRECTIONAL CHORDING GESTURES

BACKGROUND OF THE INVENTION

1. Field of the Invention

Embodiments of the present invention relate generally to multi-touch surfaces and, more specifically, to multi-touch marking menus and directional chording gestures.

2. Description of the Related Art

User interfaces (UIs) for software programs are designed to include interface elements that are selectable using an input device, such as a mouse, a keyboard, or stylus. The input device is often used to select a specific interface element. Multi-touch surfaces, such as touch pads or touch screens, allow for one or more fingers to be used to navigate the UI. Using one or more fingers on a multi-touch surface, however, simply does not provide the precision of input that is required to navigate UIs effectively.

Several modifications in UI design have been attempted to increase the accuracy of input by one or more fingers to a multi-touch screen, including the ability to zoom-in and zoom-out on elements included the UI or structuring the UI to include a list of large selectable elements. The zoom-in and zoom-out features allow users to interact more efficiently with small interface elements included in the UI since the UI elements can be enlarged to a width and height that is easily selectable by placing a fingertip into contact with the multi-touch screen. Similarly, UIs that include lists of large selectable elements are easily navigated by users since each large selectable element often exceeds the size of a fingertip used to provide input to the multi-touch screen. However, these UI techniques consume precious screen real estate and/or require that the user continually adjusts the zoom level of the interface for accurate input, causing inefficient and cumbersome interaction.

As the foregoing illustrates, there remains a need in the art for a user interface technique that overcomes the drawbacks associated with conventional approaches.

SUMMARY OF THE INVENTION

One embodiment of the invention provides a method for interacting with a multi-touch surface to perform an operation. The method includes detecting that at least one finger is in contact with the multi-touch surface, identifying a chord defined by a combination of fingers associated with the at least one finger in contact with the multi-touch surface, and performing a first function associated with the operation based on the chord.

One advantage of embodiments of the invention is that the input capabilities of the multi-touch surface are significantly expanded as a result of the chords that are detectable by the multi-touch surface through the above techniques.

BRIEF DESCRIPTION OF THE DRAWINGS

So that the manner in which the above recited features of embodiments of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of embodiments of the invention. However, it will be apparent to one of skill in the art that embodiments of the invention may be practiced without one or more of these specific details. In other instances, well-known features have not been described in order to avoid obscuring embodiments of the invention.

Figure 1:
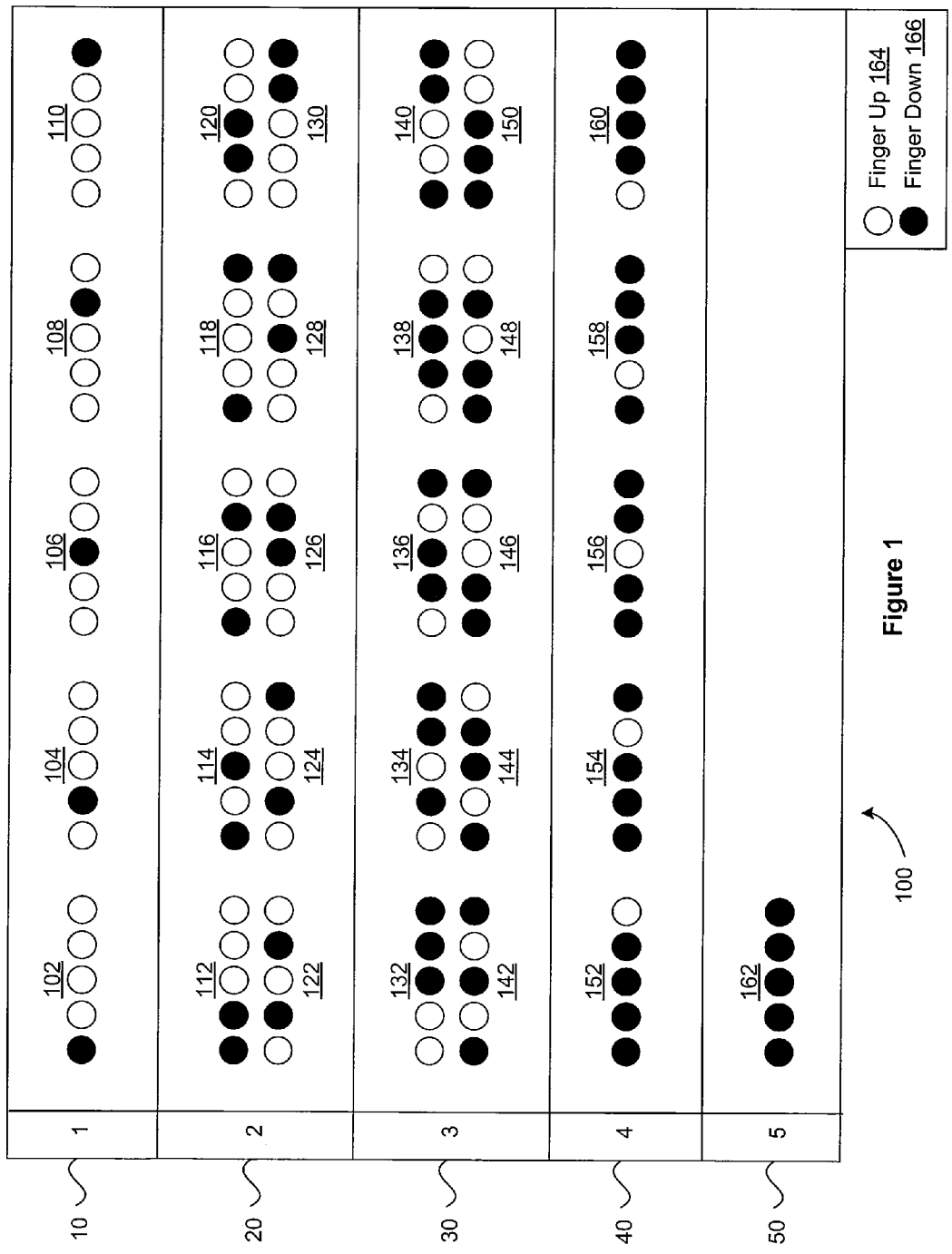
FIG. 1 is a conceptual diagram illustrating a table of thirty-one possible chords that may be initiated by using different combinations of five fingers on one hand, according to one embodiment of the invention.

FIG. 1 is a conceptual diagram illustrating a table 100 of thirty-one possible chords that may be initiated by using different combinations of five fingers on one hand, according to one embodiment of the invention. As shown, the table 100 includes row 10, row 20, row 30, row 40, row 50, chords 102-162, finger up representation 164, and finger down representation 166.

Rows 10, 20, 30, 40, and 50 include the different chords that can be established on a multi-touch surface using five fingers of a hand. Each of the chords 102-162 depicted in the table 100 includes five circles, where each circle maps to a particular finger of the hand. The finger up representation 164 represents a finger that is not in contact with the multi-touch surface; whereas, the finger down representation 166 represents a finger that is in contact with the multi-touch surface.

The row 10 includes the chords 102, 104, 106, 108, and 110 that can be established by placing a single finger of the hand into contact with the multi-touch surface. The row 20 includes the chords 112, 114, 116, 118, 120, 122, 124, 126, 128, and 130 that can be established by placing two fingers of the hand into contact with the multi-touch surface. The row 30 includes the chords 132, 134, 136, 138, 140, 142, 144, 146, 148, 150 that can be established by placing three fingers of the hand into contact with the multi-touch surface. The row 40 includes the chords 152, 154, 156, 158, and 160 that can be established by placing four fingers of the hand into contact with the multi-touch surface. The row 50 includes the chord 162 that can be established by placing five fingers of the hand into contact with the multi-touch surface.

In one embodiment, if the right hand is used to establish the chords 102-162 shown in the table 100, then the thumb corresponds to the left-most circle in the chord and the pinky finger corresponds to the right-most circle in the chord. For example, if using the right hand, then the chord 120 represents a chord where the index finger and middle finger are in contact with the multi-touch surface, while the other fingers are not in contact with the multi-touch surface. In another example, the chord 160 represents a chord where the index finger, middle finger, ring finger, and pinky finger are in contact with the multi-touch surface, while the thumb is not in contact with the multi-touch surface. In an alternative embodiment, if the left hand is used to establish the chords 102-162, the pinky finger corresponds to the left-most circle in the chord and the thumb corresponds to the right-most circle in the chord. For example, in embodiments that use the left hand, the chord 136 represents a chord where the thumb, middle finger, and ringer finger are in contact with a multi-touch surface, while the other fingers are not in contact with the multi-touch surface.

In conventional systems, multi-touch surfaces are unable to determine which specific fingers are placed into contact with the multi-touch surface. As described in greater detail below, embodiments of the invention provide a technique for determining which specific fingers are in contact with the multi-touch surface, and, from that determination, providing certain functionality.

Figure 2A:
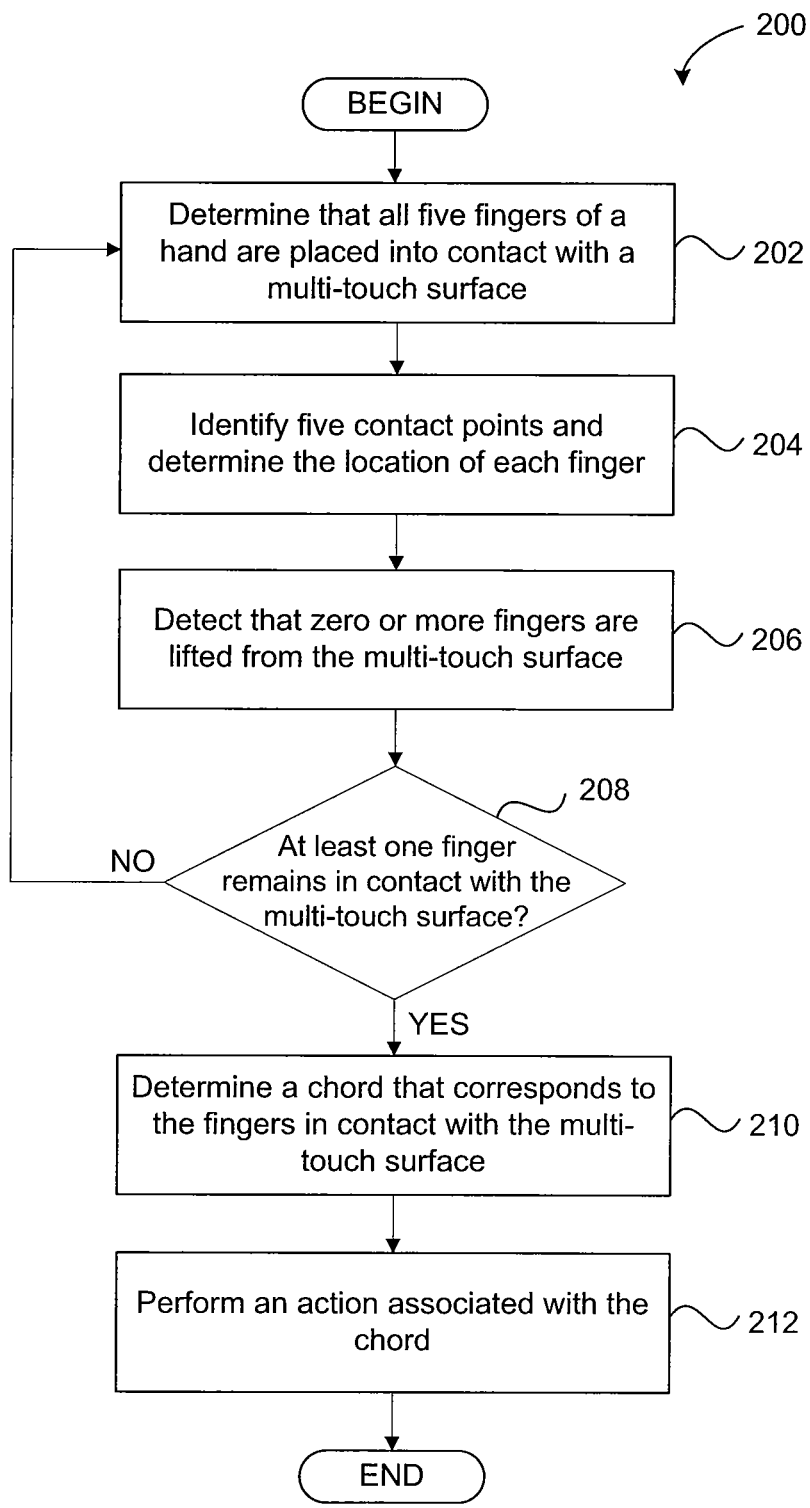
FIG. 2A is a flow diagram of method steps for determining a chord using a lift-and-stroke technique, according to one embodiment of the invention.

FIG. 2A is a flow diagram of method steps for determining a chord using a lift-and-stroke technique, according to one embodiment of the invention. Persons skilled in the art will understand that, even though the method 200 is described in conjunction with the system of FIGS. 1, 2B, 3B-5, and 7-9, any system configured to perform the method steps, in any order, is within the scope of embodiments of the invention.

As shown, the method 200 begins at step 202, where a processor included in a computer system determines that a user has placed all five fingers of a hand into contact with the multi-touch surface. In some embodiments, the multi-touch surface may be programmed to emit a sound to the user when the five fingers are in contact with the multi-touch surface. In some embodiments, the computer system comprises a multi-touch surface.

At step 204, the processor identifies five contact points and determines the location of each finger of the hand. In one embodiment, the multi-touch surface utilizes an (x,y) coordinate system. When each of the five contact points is established between the five fingers of the hand and the multi-touch surface, (x,y) coordinate information for each of the five contact points is transmitted to the processor from the multi-touch surface. The processor receives the (x,y) coordinate information associated with each finger and performs calculations to determine which fingers of the hand correspond to the five (x,y) coordinates. The calculations may include determining the distance between (x,y) coordinate information for a pair of fingers, the slope between (x,y) coordinate information for a pair of fingers, or the like. In some embodiments, the multi-touch surface may be configured to be used in a right-handed or a left-handed operation mode. In these embodiments, the processor may take the operation mode into consideration when performing the calculations to determine which fingers of the hand correspond to the five (x,y) coordinates. When the processor of the multi-touch surface has completed its calculations on the five (x,y) coordinates, a finger coordinate map, which is an map of the specific fingers that are associated with the five (x,y) coordinate information, is stored in a memory. The memory may be included in a computer system and/or included in the multi-touch surface device.

At step 206, the processor detects that zero or more fingers are lifted from the multi-touch surface. In one embodiment, the user lifts his or her middle, ring, and pinky fingers, so that only the thumb and index finger remain in contact with the multi-touch surface. The multi-touch surface may be programmed to display a pulse animation that communicates to the user that the one or more contact points are no longer in contact with the multi-touch surface. For example, three expanding circle animations are displayed on the multi-touch surface at each of the contact points that were lifted from the multi-touch surface. The animations provide notice to the user that he or she has modified the number of fingers that are in contact with the multi-touch surface. In some embodiments, the processor continuously and/or periodically determines which fingers are in contact with the multi-touch surface.

At step 208, the processor determines whether at least one finger remains in contact with the multi-touch surface. As described at step 206, the processor may continuously and/or periodically determine which fingers are in contact with the multi-touch surface. In this manner, the processor can identify any change in the user's input to the multi-touch surface. For example, if the user removes his or her ring and pinky fingers from the multi-touch surface, then the processor will receive three (x,y) coordinate information and is aware that only three fingers remain in contact with the multi-touch surface.

If the processor determines that no fingers remain in contact with the multi-touch surface, then the method 200 returns to step 202, described above. In one embodiment, the user removes all five of his or her fingers when he or she decides to cancel an input to the multi-touch surface.

If, at step 208, the processor determines that at least one finger remains in contact with the multi-touch surface, then the method 200 proceeds to step 210. At step 210, the processor determines a chord that corresponds to the fingers that remain in contact with the multi-touch surface. As described in step 204, the memory may include a finger coordinate map of the user's five fingers that were originally placed into contact with the multi-touch surface. For example, the user is right-handed, and has lifted his or her index, ring, and pinky fingers—leaving only his or her thumb and middle fingers in contact with the multi-touch surface. The processor of the multi-touch surface then receives two (x,y) coordinate information: one (x,y) coordinate information for the contact point of the thumb, and another (x,y) coordinate information for the contact point of the middle finger. The processor recalls the finger coordinate map from the memory and compares the two (x,y) coordinates to the coordinates stored within the finger coordinate map. The processor then identifies the two fingers of the user's hand that correspond to the two (x,y) coordinate information, and determines that the user's current finger configuration. In the example where the user maintains contact with the thumb and middle fingers, the processor determines that the chord being gestured is chord 114, as shown in FIG. 1. In some embodiments, the processor is programmed to tolerate a certain range of movement to compensate for small movement of the fingers in contact multi-touch surface that might occur when the user removes one or more fingers from the multi-touch surface in step 206.

At step 212, the processor performs an action that is associated with the chord. In one embodiment, the processor identifies the chord and performs a memory lookup of the functionality that is associated with the chord. In one embodiment, gesturing a chord is associated with the displaying a user interface (UI) menu, where the UI menu that is displayed is based on which chord is gestured. In some embodiments, the functionality associated with each chord may be customized by the user.

Embodiments of the method 200 may include a programmed delay in the response time of the multi-touch surface to the input of the user. More specifically, in step 206, it is unlikely that the user will lift all of the fingers being lifted at the exact same time. In one embodiment, if the user plans to lift his or her ring and pinky fingers, but lifts his or her pinky finger first, then the processor receives an update of the four fingers that are in contact with the multi-touch surface, identifies the chord 152 of FIG. 1, and executes the functionality that is associated with the chord 152. In alternative embodiments, if the processor is programmed to wait for subsequent inputs at step 206, then the user may be provided adequate time to lift his or her ring finger without being presented with the functionality associated with chord 152. Thus, when the ring finger is also lifted within a threshold amount of time, the processor receives the user's intended chord, i.e., the chord 150 of FIG. 1, and the processor performs the functionality associated with the chord 150. Implementing a threshold time in this manner provides a more intuitive user input technique to the user and compensates for the delays and mistakes that are associated with the user input.

Figure 2B:
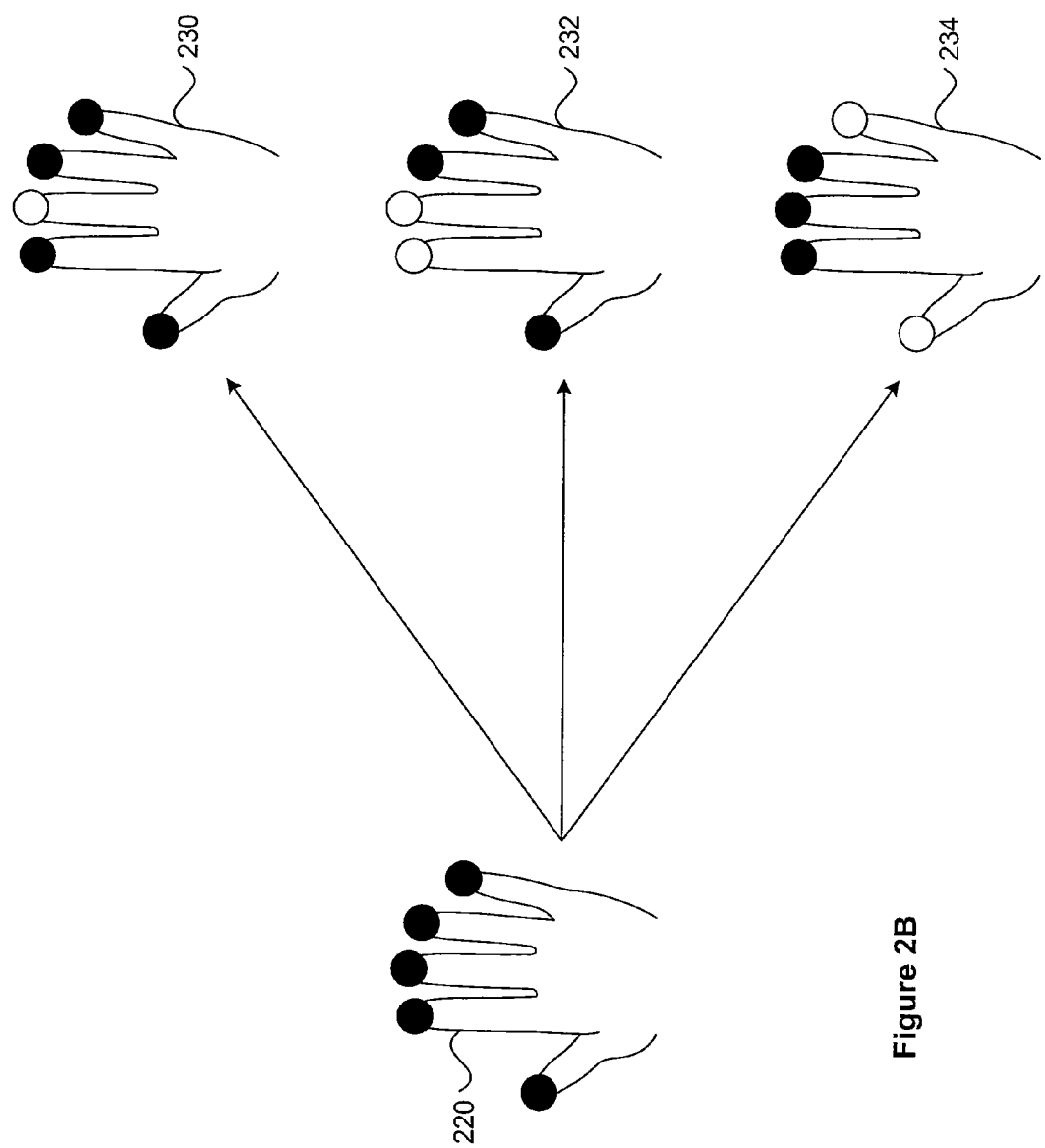
FIG. 2B is a conceptual diagram illustrating establishing a chord using the lift-and-stroke technique, according to one embodiment of the invention.

FIG. 2B is a conceptual diagram illustrating establishing a chord using the lift-and-stroke technique, according to one embodiment of the invention. As described in FIG. 2A, the lift-and-stroke technique beings when the user places all five fingers of a hand into contact with a multi-touch surface so that a finger coordinate map can be created and stored in a memory. As shown in FIG. 2B, a lift-and-stroke starting point 220 is associated with the user placing all five fingers down onto the multi-touch surface. The lift-and-stroke starting point 220 illustrates a right-handed user who places all five fingers of his or her hand into contact with the multi-touch surface. In one embodiment, the multi-touch surface is programmed to display an animation on the multi-touch surface when all five of the user's fingers are in contact with the multi-touch surface. For example, the background of the multi-touch surface may flash to communicate to the user that the multi-touch surface is prepared for the user to establish a particular chord using the lift-and-stroke method, as described in step 208. In alternative embodiments, an audible chime is emitted from speakers that are included in the multi-touch surface, which may also effectively communicate to the user that the multi-touch surface is prepared for the user to establish one of the chords 102-160 included in FIG. 1. It should be noted that the chord 162 is equivalent to the lift-and-stroke starting point 220, where all five fingers of the user's hand are placed into contact with the multi-touch surface.

Lift-and-stroke ending points 230, 232, 234 are also shown in FIG. 2B. The lift-and-stroke ending point 230 is established when the user removes his or her middle finger after placing all five fingers into contact with the multi-touch surface. The lift-and-stroke ending point 232 is established when the user removes his or her index and middle fingers after placing all five fingers into contact with the multi-touch surface. The lift-and-stroke ending point 234 is established when the user removes his or her thumb and pinky fingers after placing all five fingers into contact with the multi-touch surface. Each of the chords 102-160 included in FIG. 1 can be recognizable by the multi-touch surface through utilization of the lift-and-stroke technique.

Figure 3A:
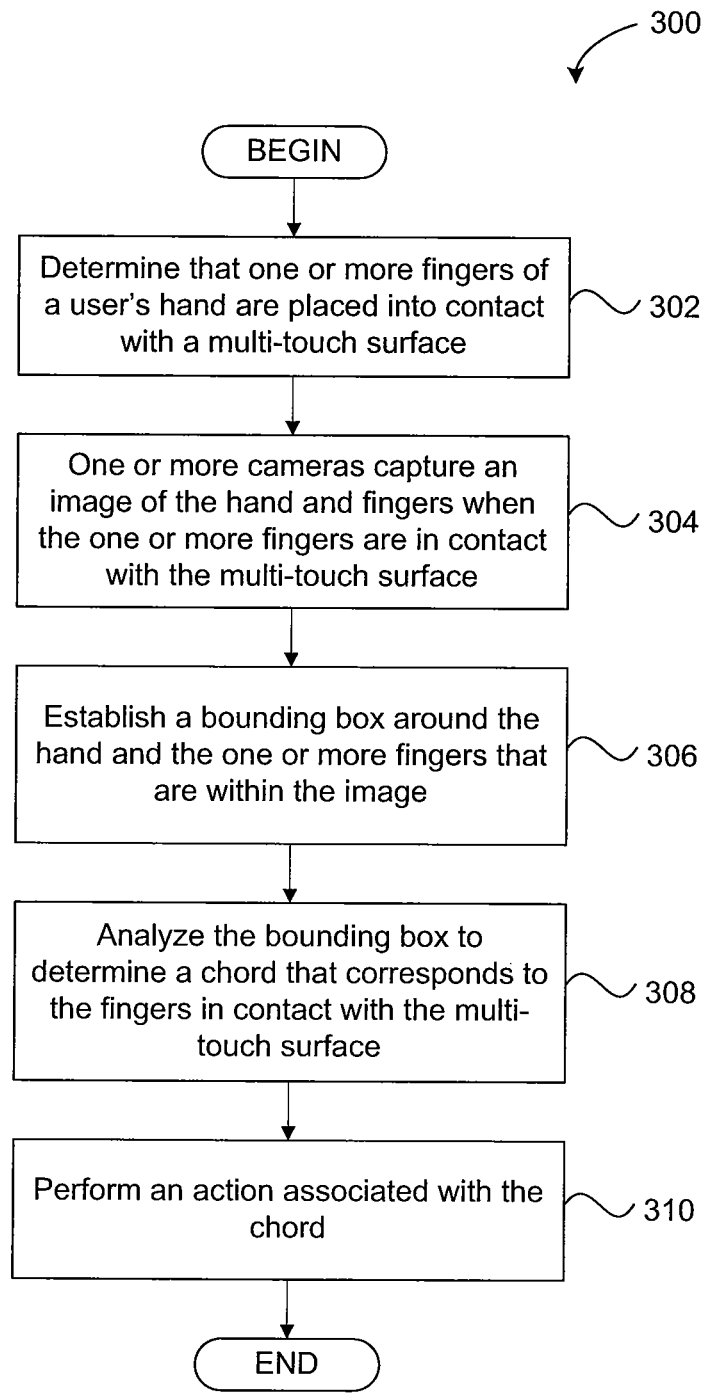
FIG. 3A is a flow diagram of method steps for determining a chord using a camera system, according to one embodiment of the invention.

FIG. 3A is a flow diagram of method steps for determining a chord using a camera system, according to one embodiment of the invention. Persons skilled in the art will understand that, even though the method 300 is described in conjunction with the systems of FIGS. 1, 2B, 3B-5, and 7-9, any system configured to perform the method steps, in any order, is within the scope of embodiments of the invention.

As shown, the method 300 begins at step 302, where a processor determines that one or more fingers of a user's hand are placed into contact with a multi-touch surface. In one embodiment, the multi-touch surface includes a processor that, in conjunction with one or more cameras, performs the steps of the method 300. In alternative embodiments, a processor included in computer system coupled to the multi-touch surface may include the processor that performs the steps of the method 300. In some embodiments, the multi-touch surface may be programmed to emit a sound when one or more fingers are in contact the multi-touch surface. For example, the user may place his or her thumb, index, and middle fingers into contact with the multi-touch surface, represented by the chord 150 included in FIG. 1.

At step 304, one or more cameras capture an image of the hand and the fingers when one or more fingers are in contact with the multi-touch surface. In one embodiment, one or more cameras are placed beneath the multi-touch surface and are capable of capturing any movement or contact points within the bounds of the multi-touch surface. For example, the multi-touch surface may be broken into four quadrants, where movement that occurs in each quadrant is captured by a different camera that is assigned to the quadrant.

As described in the example above, the chord 150 of FIG. 1 may be established by the user's hand. At step 304, the camera system of the multi-touch surface tracks and captures images of the user's hand and fingers, and stores each image in a memory that is included in the multi-touch surface. In some embodiments, an input delay is implemented, where the processor determines that a user has finished making the chording gesture when the user has stopped moving his or her hand and/or fingers by analyzing the multiple images that are stored in the memory. In one embodiment, the camera of the multi-touch surface captures and stores two images per second into the memory of the multi-touch surface. Therefore, if two consecutive images are nearly identical, then the processor determines that the user's hand, and thus chording gesture, has been maintained for at least one second.

At step 306, the processor establishes a bounding box around the hand and the one or more fingers that are within the image. In one embodiment, the processor analyzes the latest images stored in the memory of the multi-touch surface to determine the area of the hand and fingers within the images. The processor can then generate a boundary around the hand and the one or more fingers, and crop any part of the image that lies outside of the boundary. The cropped image may then be stored as a bounding box in a memory.

At step 308, the processor analyzes the bounding box to determine a chord that corresponds to the fingers in contact with the multi-touch surface. In one embodiment, the processor begins by loading image recognition software to assist in the processing of the data associated with the bounding box. For example, the image recognition software identifies the boundary and the orientation of the hand by identifying the palm portion and the inner portion of the hand. The image recognition software also identifies the boundary and the orientation of the fingers of the hand by identifying the finger tips. The image recognition software combines the boundaries and crops the bounding box, where the cropped bounding box perfectly bounds the hand and the fingers. The image recognition software then analyzes the fingers that are within to the cropped bounding box to determine the thumb, index, middle, ring, and pinky fingers. According to some embodiments, individual fingers are determined by analyzing the positions of the contact points relative to each other and to the bounding box geometry. For example, in one embodiment, a contact point within a threshold distance of the horizontal center of the bounding box could be determined to be the middle finger. In another example, a contact point on the left edge of the bounding box could be determined to be the thumb (e.g., for a righted-handed user).

In some embodiments, the bounding box is further cropped so that the remaining bounding box includes only the fingers. This is referred to as a "split bounding box." Finally, the image recognition software determines which of the five fingers are actually contacting the multi-touch surface by analyzing various components such as pressure points, finger curvature, or the like. When the image recognition software has completed its processing, the actual chord inputted by the user, e.g., the chord 150 of FIG. 1, is identified. In some embodiments, the image recognition software is installed in a computer system and is executed by a processor included in the computer system.

At step 310, the processor performs an action associated with the chord. In one example, the processor determines that the user has gestured the chord 150 of FIG. 1, and performs a memory lookup to determine the functionality that is associated with the chord 150. In some embodiments, the functionality of the chord 150 may be customized by the user to display an edit menu within computer-aided design (CAD) software that is being displayed on the multi-touch surface. The user can then lift his or her thumb, index, and middle fingers (i.e., the fingers that are associated with the chord 150) and the edit menu remains displayed. The user can then select elements within the edit menu by contacting a single finger to the multi-touch surface, where the single finger contact point lies within the bounds of the selected edit menu element. In alternative embodiments, after the edit menu is displayed in response to detecting the chord 150, the user may slide his or her fingers in the direction of an edit menu option, without lifting the fingers from the multi-touch surface, to select the edit menu option.

Figure 3B:
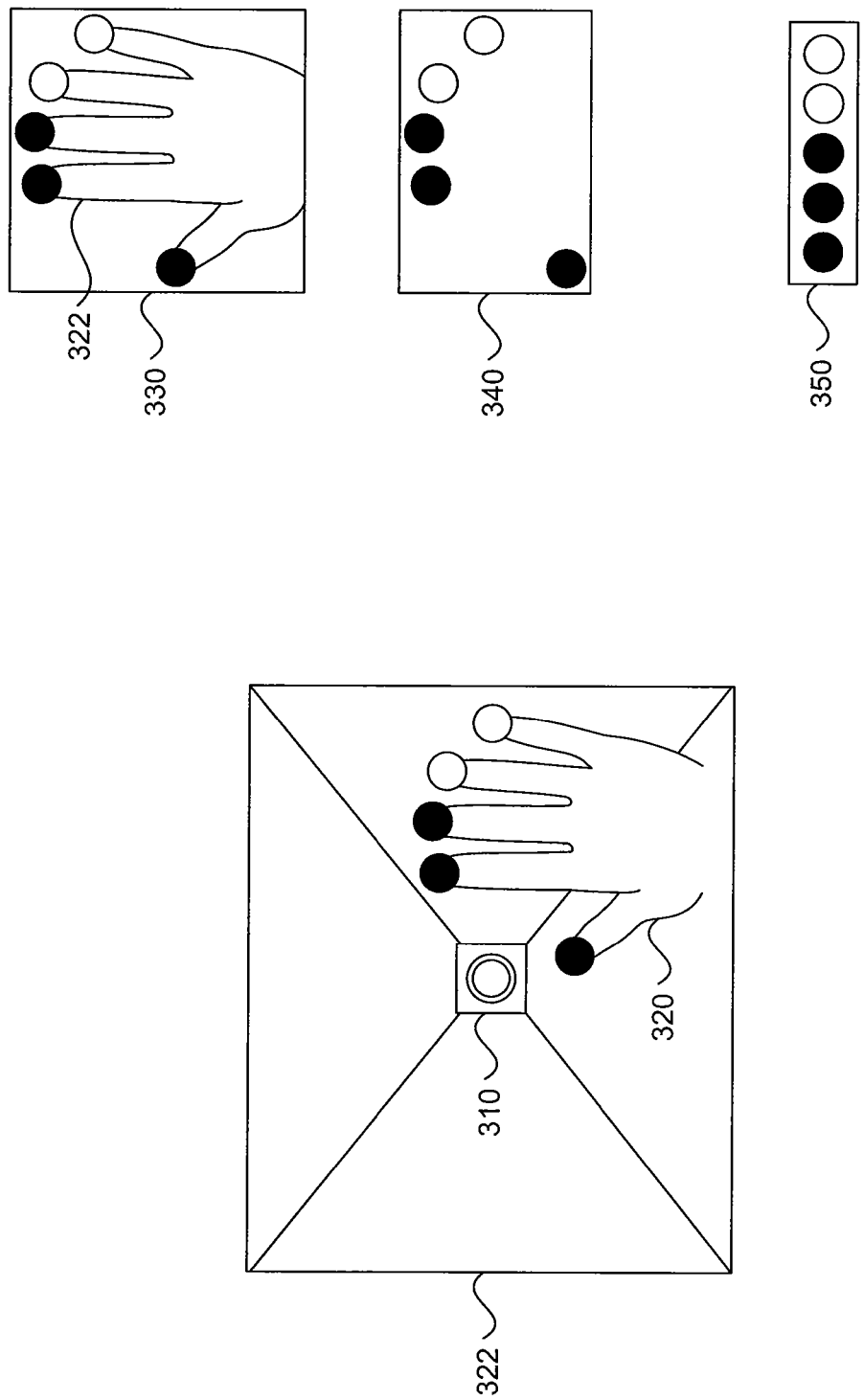
FIG. 3B is a conceptual diagram illustrating establishing a chord using the camera system, according to one embodiment of the invention.

FIG. 3B is a conceptual diagram illustrating establishing a chord using the camera system, according to one embodiment of the invention. FIG. 3B illustrates a camera 310, a chord input 320, a bounding box 322, a cropped bounding box 330, a split bounding box 340, and a chord 350

The camera 310 tracks the movement of the users hand and fingers. In one embodiment, a single camera is placed beneath the multi-touch surface so that the camera can track the user's hand and fingers. In other embodiments, two or more cameras are placed behind the multi-touch surface so that the multi-touch surface can be partitioned and more accurately track the user's hand and fingers. In still further embodiments, the one or more cameras may be placed above the multi-touch surface or to the sides of the multi-touch surface.

In the example shown in FIG. 3B, the chord input 320 is established when the user places his or her thumb, index, and middle fingers into contact with the multi-touch surface. In one embodiment, an audible chime is emitted from speakers that are included in the multi-touch surface, which communicates to the user that he or she has established contact with the multi-touch surface. The processor of the multi-touch surface establishes the bounding box 322 around the chord input 320, where the bounding box 322 borders the entire image of the user's hand and fingers. In one embodiment, the bounding box 322 is established as described in step 306 of FIG. 3A. The processor then determines the cropped bounding box 330 by analyzing the bounding box 322 and cropping each section of the bounding box 322 that does not include a portion of the hand and/or fingers.

The processor then determines the split bounding box 340 by analyzing the cropped bounding box 330 and isolating each finger of the hand. The processor crops out any information that is not associated with each of the fingers of the hand, as illustrated by the split bounding box 340. The split bounding box 340 is processed as described in step 306 of FIG. 3A.

The chord 350 associated with the gesture is then identified by the processor. Again, in one embodiment, the processor begins with the bounding box 322, which is cropped to the bounding box 330. The bounding box 330 is then cropped to the split bounding box 340, and the split bounding box 340 is cropped to the actual chord 350. The processor then compares the chord 350 to a map of chords that is stored in the memory to determine what action to take in response to detecting the chord 350.

Figure 4:
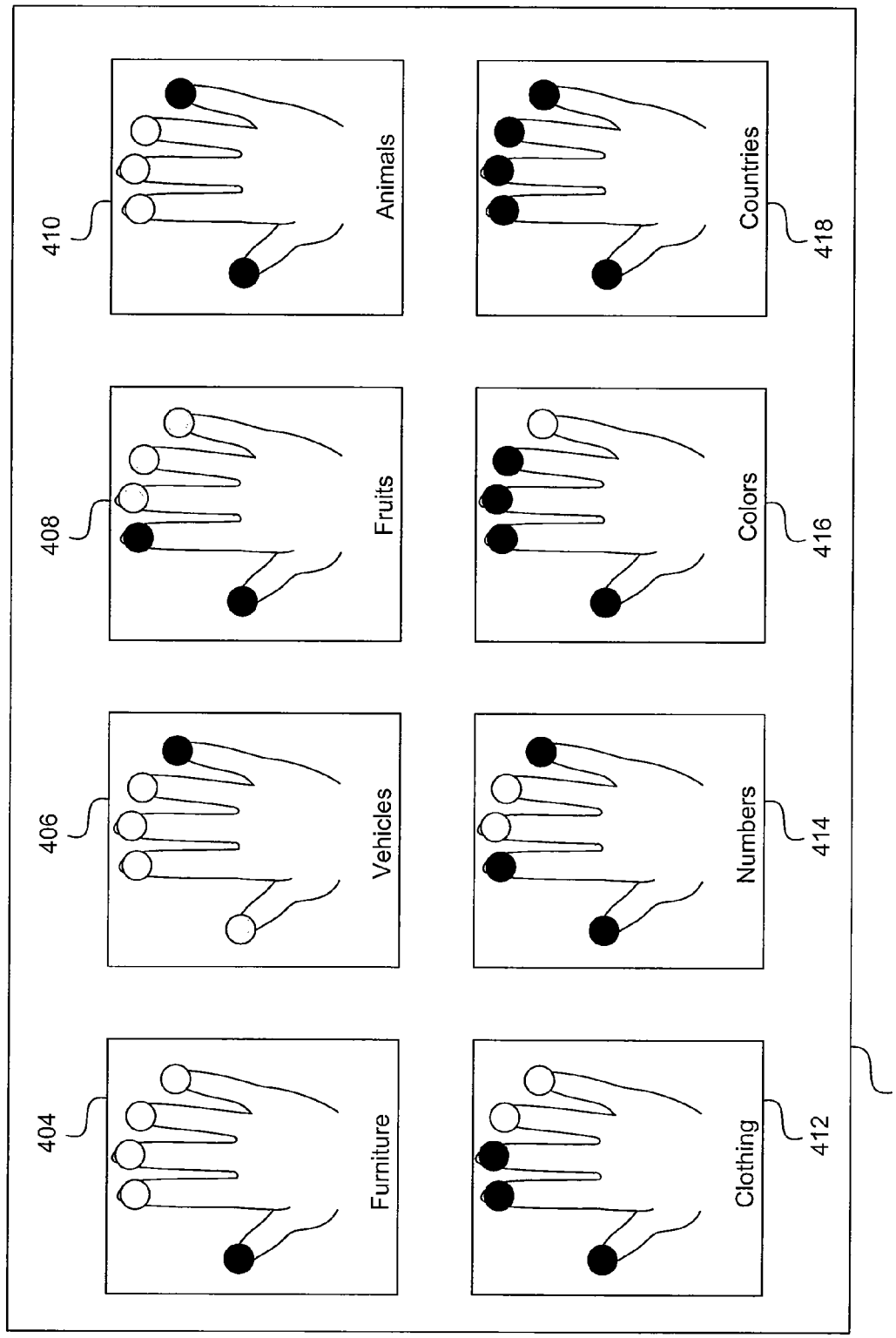
FIG. 4 is a conceptual diagram illustrating a map of eight chords and corresponding functions, according to one embodiment of the invention.

FIG. 4 is a conceptual diagram illustrating a map of eight chords and corresponding functions, according to one embodiment of the invention. FIG. 4 includes a chord legend 402 and chording templates 404, 406, 408, 410, 412, 414, 416, 418. In one embodiment, the chord legend 402 is displayed at the top-right of a user interface associated with a graphics application that is executing on a computer system. According to various embodiments, each of the chording templates 404, 406, 408, 410, 412, 414, 416, 418 can be gestured by a user via either the lift-and-stroke technique or via the camera system technique, as described herein.

The chord legend 402 can display any number of chording templates. In one embodiment, the chord legend 402 displays eight different chording templates, as shown in FIG. 4. A chording template is a visual indication of a chord and its corresponding function. The chord legend 402 provides users with a reference for some of the available functionality that can be implemented by gesturing different chords, without requiring the user to memorize each individual chord. For example, the chording template 404 represents a function for exposing a selection of pre-defined drawings of furniture when a user's thumb is placed into contact with the multi-touch surface. In some embodiments, each of the chording templates 404, 406, 408, 410, 412, 414, 416, 418 is customizable and may include any of the chords 102-162. Each chord that is gestured is then tied to an associated function.

In addition, in some embodiments, the chord legend 402 is dynamic and changes based upon the user's selection of a chording template. For example, if the user selects the fruits chording template 408, a selection of different fruit drawings is displayed and the chord legend 402 replaces each of the chording templates 404-418 with eight new chording templates that display filter functionalities that are available to the displayed fruit drawing selection such as color, shape, or the like.

In alternative embodiments, any number of chording gestures may be included in the chord legend 402.

Figure 5:
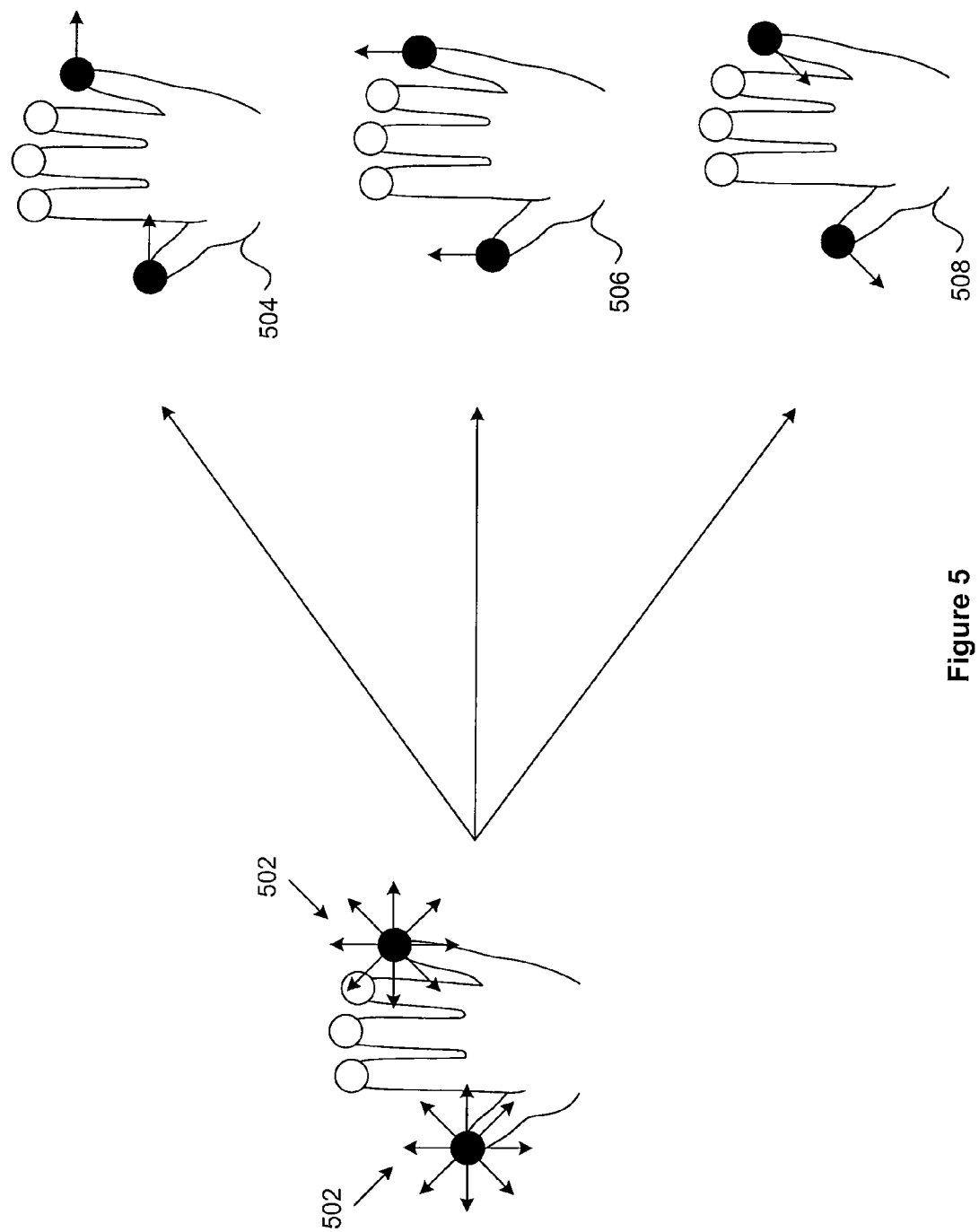
FIG. 5 is a conceptual diagram illustrating establishing a chord and performing a chording gesture, according to one embodiment of the invention.

FIG. 5 is a conceptual diagram illustrating establishing a chord and performing a chording gesture, according to one embodiment of the invention. As shown, after a user has established a chord, the user can slide his or her hand along the multi-touch surface in one of eight different gesture possibilities 502. For example, the user can place his or her thumb and pinky finger onto the multi-touch surface and then slide both the thumb and pinky finger in an upwards to direction along the multi-touch surface. A chording gesture can be implemented by establishing the chord using either the lift-and-stroke technique or the camera system technique, and then performing a directional motion across the multi-touch surface while maintaining the chord.

The chording gesture possibilities 502 represent the chording gestures that are available when a chord is detected by the multi-touch surface. In the embodiment shown in FIG. 5, eight different gesture possibilities 502 are recognized by the multi-touch surface. The eight possible directions include north, northeast, east, southeast, south, southwest, west, and northwest. In alternative embodiments, the multi-touch surface recognizes additional directions (e.g., north-northeast), or recognizes patterns (e.g., a circular pattern).

FIG. 5 also shows examples of the user performing an east chording gesture 504, a north chording gesture 506, and a southwest chording gesture 508. Each of the chording gestures 504, 506, 508 may be tied to a particular function or action, as described herein. One example of an action associated with a chording gesture is displaying a user interface selection menu.

Figure 6:
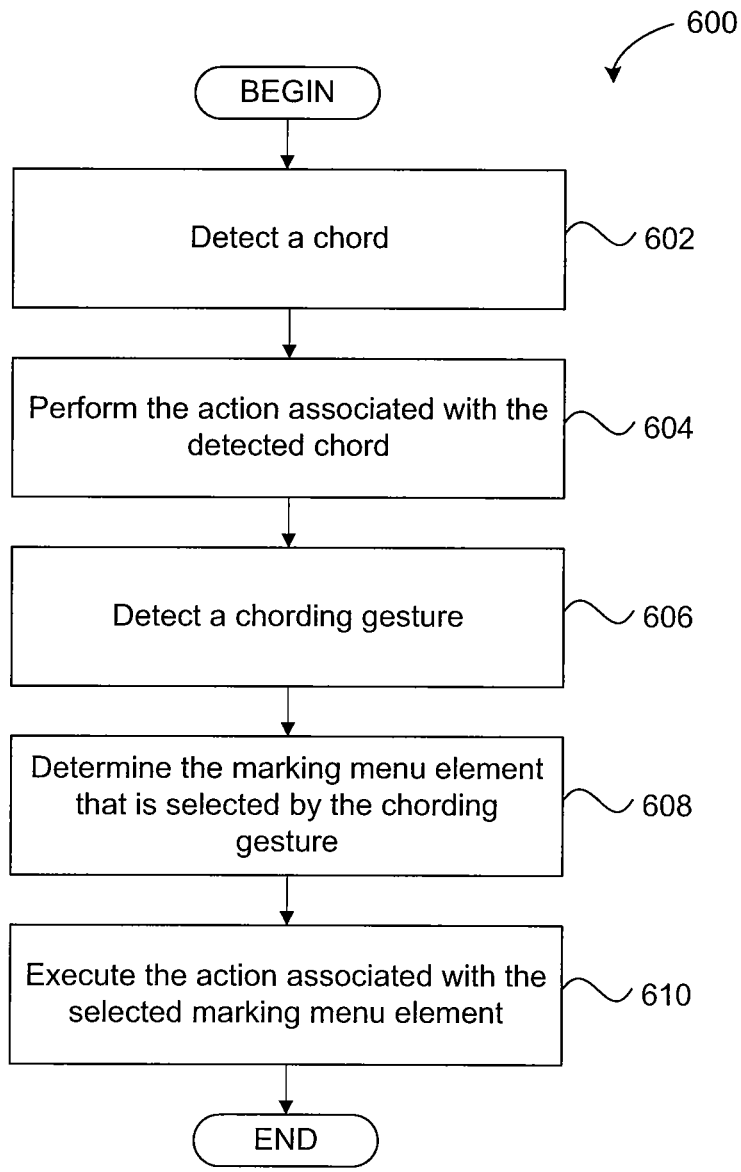
FIG. 6 is a flow diagram of method steps for executing commands included in a marking menu using chording gestures, according to one embodiment of the invention.

FIG. 6 is a flow diagram of method steps for executing commands included in a marking menu using chording gestures, according to one embodiment of the invention. Persons skilled in the art will understand that, even though the method 600 is described in conjunction with the systems of FIGS. 1, 2B, 3B-5, and 7-9, any system configured to perform the method steps, in any order, is within the scope of embodiments of the invention.

As shown, the method 600 begins at step 602, where a processor detects a chord. In various embodiments, the processor detects the chord by using the lift-and-stroke technique or the camera system technique.

Figure 7:
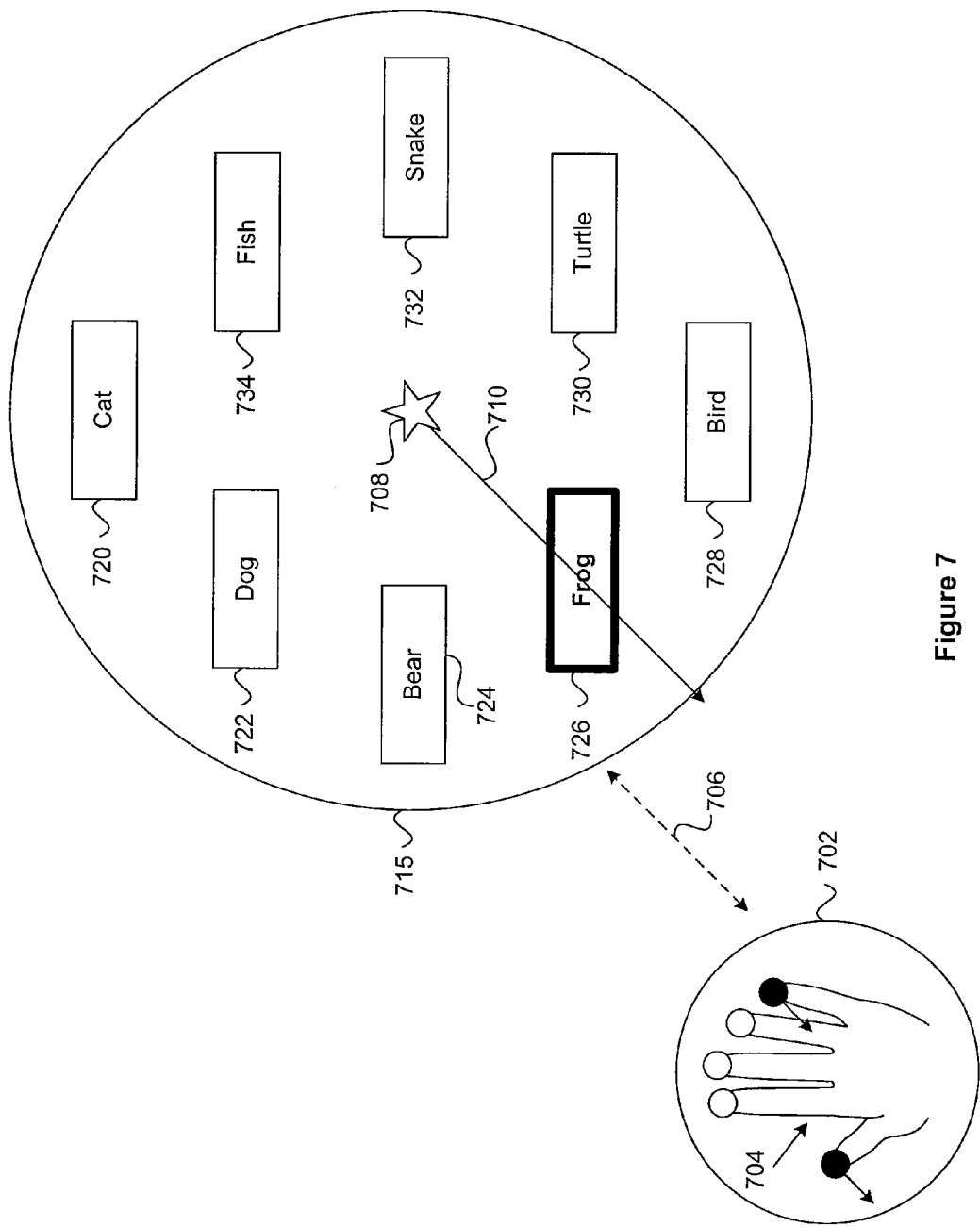
FIG. 7 is a conceptual diagram illustrating executing commands included in the marking menu using chording gestures, according to one embodiment of the invention.

At step 604, the processor performs the action associated with the detected chord. In one example, the user establishes the chord 114 of FIG. 1 by placing his or her thumb and middle fingers into contact with the multi-touch surface. The processor performs a lookup and determines that, based on the chord input, a marking menu should be displayed to the user. An example of a marking menu is shown in FIG. 7 as marking menu 715, described in greater detail below. The marking menu is subsequently displayed to the user.

At step 606, the processor detects a chording gesture. In one embodiment, the user slides the chord 114 in a north direction toward the top-most element that is displayed within the marking menu. For example, the user may drag his or her thumb and middle finger in an upward direction while maintaining the contact of the thumb and middle finger to the multi-touch surface. In another example, the user moves the chord 114 in a south direction toward the bottom-most element that is displayed within the marking menu.

At step 608, the processor determines the marking menu element that is selected by the chording gesture. In the example described above, the user performs a north chording gesture and drags his or her thumb and middle finger toward the topmost element within the marking menu. The processor detects this chording gesture and determines that the function associated with the topmost element should be selected.

At step 610, the multi-touch surface executes the action associated with the selected marking menu element. In one example, the action that is associated with the selected element includes placing the multi-touch surface into a sleep mode. In alternative embodiments, the action that is associated with the selected element includes displaying a nested marking menu, where the user can subsequently perform a second chording gesture to select one or more items including in the nested marking menu. Nested marking menus provide an intuitive way for the user to interact with multi-level menus that, advantageously, provide a large number of functions that can be executed through a simple chain of chording gestures. Thus, in some embodiments involving nested marking menus, the method 600 returns to step 602 following step 610 to determine and execute commands associated with the different levels of the nested marking menu.

FIG. 7 is a conceptual diagram illustrating executing commands included in the marking menu 715 using chording gestures, according to one embodiment of the invention. As shown, the user established a chord with the multi-touch surface, causing the marking menu 715 to be displayed. The marking menu 715 includes center point 708 and marking menu items 720, 722, 724, 726, 728, 730, 732, and 734.

In some embodiments, the marking menu 715 is configured to be displayed on the multi-touch surface at an offset 706 distance from the input area 702. For example, the length and direction of the offset 706 is configured to be 100 pixels and to the north east from the input area 702, respectively. Such an offset prevents the user's hand from blocking his or her visibility of the marking menu 715 that normally occurs if the marking menu 715 is displayed at the same location of the input area 702.

In one embodiment, the center point 708 is displayed as a star icon that is located in the center of the marking menu 715. The center point 708 provides a starting point for any chording gesture that the user can input. As also shown in FIG. 7, the user may then perform a southwest chording gesture 704. Performing the southwest chording gesture 704 causes marking menu selection 710 to be performed. Marking menu selection selects marking menu item 726. In some embodiments, a line is drawn on the multi-touch surface representing marking menu selection 710 while the user executes the chording gesture so that the user can adjust the direction of the chording gesture should it be off-course. As such, displaying the line helps prevent erroneous input.

In some embodiments, each of the marking menu items 720-734 can be associated with a nested marking menu. For example, the marking menu item 728, when selected, may be configured to display a subsequent marking menu that is offset from the marking menu 715 by a particular length and direction. Such nested marking menus allow the user to use chording gestures to select a larger number of options. In some embodiments, the processor is configured to display each nested menu in a zig-zag fashion on the multi-touch surface, where each previously selected marking menu remains displayed on the multi-touch surface. Also, in some embodiments, the user may optionally perform the opposite of the latest-performed chording gesture to cancel the latest-displayed marking menu and return to the previous marking menu, i.e., performing a chording gesture that is the opposite of the chording gesture performed to select a particular marking menu item.

In other embodiments, the marking menu 715 is configured to include fewer or more UI items than the eight menu items shown in FIG. 7. Including fewer UI items in a marking menu, for example, may allows for simple north, east, south, and west chording gestures to be input and recognized by the multi-touch surface so that novice users can effectively navigate marking menus. Including more UI items in a marking menu may allow for advanced chording gestures to be recognized by the multi-touch surface, including, for example, a north-northeast chording gesture.

Figure 8:
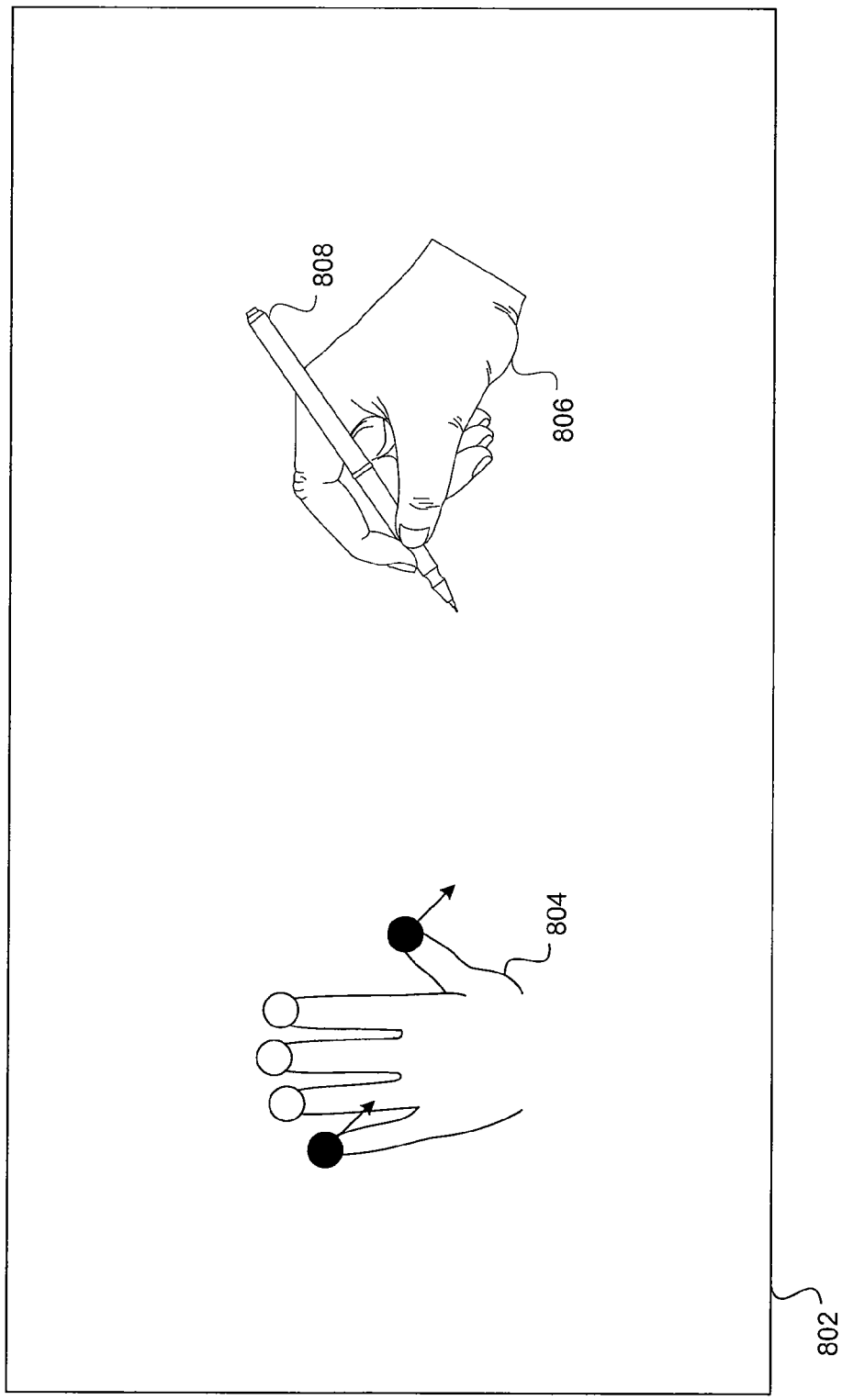
FIG. 8 is a conceptual diagram illustrating using a digital stylus in conjunction with a chording gesture, according to one embodiment of the invention.

FIG. 8 is a conceptual diagram illustrating using a digital stylus 808 in conjunction with a chording gesture, according to one embodiment of the invention. As shown, a multi-touch surface 802 may allow for bimanual interaction. For example, the stylus 808 may be held in the right hand 806 and a chording gesture may be performed by the left hand 804.

In some embodiments, a bimanual interaction system provides users of a multi-touch surface with a more precise method for inputting data and making selections. In some embodiments, bimanual interaction allows the user to interact with smaller UI elements and to provide additional options. For example, the user may be creating an illustration using software that is being executed by a processor included in the multi-touch surface. As described in FIG. 7, chording gestures that are used in conjunction with a marking menu provide an intuitive and useful way for users to navigate the functions that are associated with the current operating mode of the multi-touch device. The user can use the software to create an illustration using the right hand 806 and the stylus 808, while using the left hand to perform chording gestures that adjust the parameters of the stylus 808, such as the width of the stroke, the color of the stroke, the texture of the stroke, or the like. Using a stylus 808 in conjunction with chording gestures is an efficient user-input technique since the user is not required to change the position of the stylus 808 across the multi-touch surface in order to select various options associated with the stylus 808.

Alternative embodiments include configurations where the user is left-handed and the chording gestures are performed using the right hand, while the stylus is held using the left hand.

Figure 9:
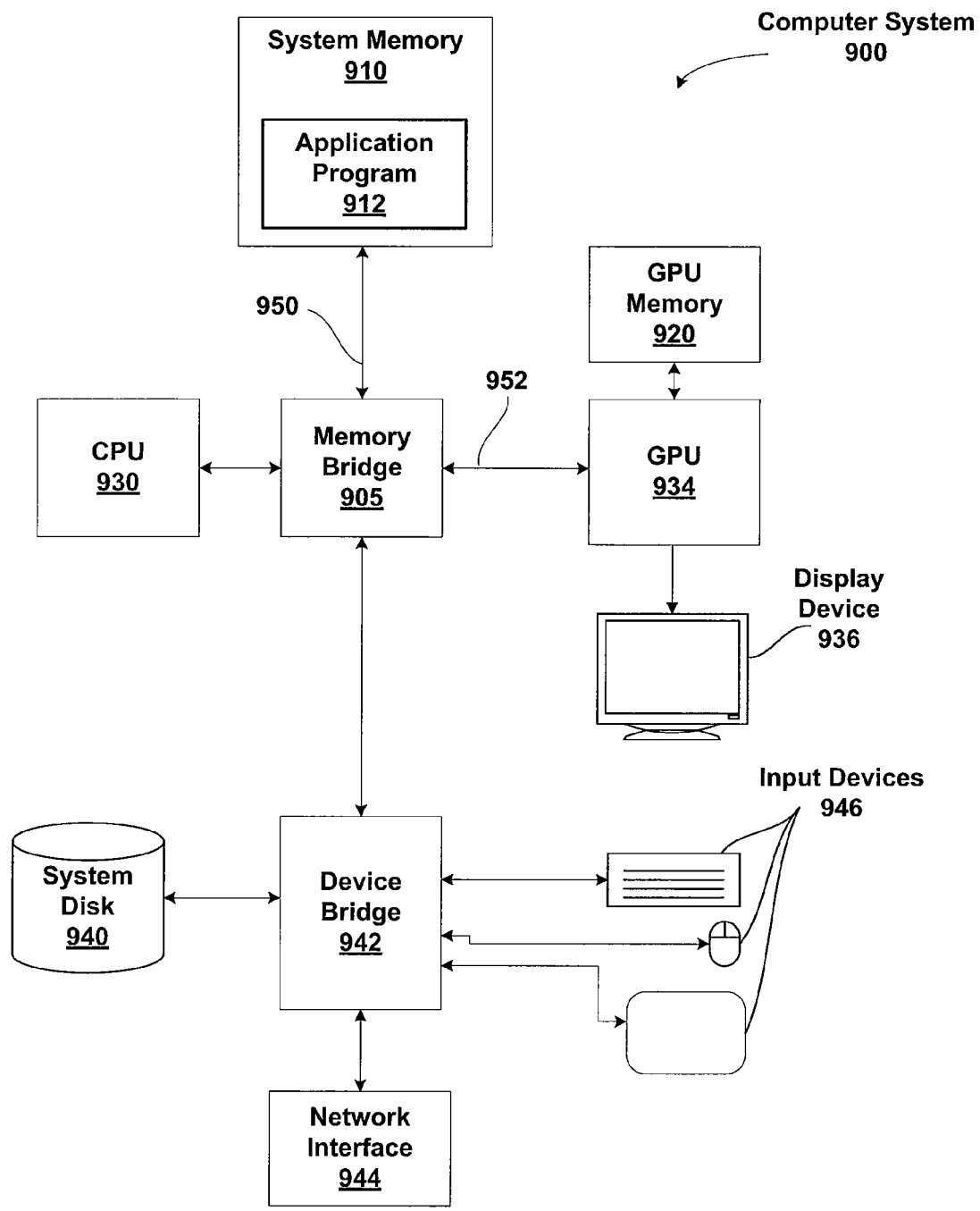
FIG. 9 is a conceptual diagram illustrating a computer system configured to implement one or more aspects of the invention.

FIG. 9 illustrates a computer system 900 configured to implement one or more aspects of the present invention. The computer system 900 includes, without limitation, a central processing unit (CPU) 930, a system memory 910, a graphics processing unit (GPU) 934, a GPU memory 920, a memory bridge 905, a display device 936, a system disk 940, a device bridge 942, a network interface 944, and input devices 946, e.g., a mouse, keyboard, touchpad, and the like. When display device 936 is a multi-touch display device, one or more of input devices 946 may be omitted and the user may use his or her hand to provide inputs directly to the multi-touch display device 936. The display device 936 may be configured to use a capacitive sensing, camera generated images, or any other technically-feasible technology used for sensing multi-finger and multi-hand inputs. In other embodiments, a multi-touch input device, such as a multi-touch touchpad, is separate from the display device 936. In one embodiment, system memory 910 is configured to store an application program 912 that, when executed by the CPU 930, is configured to provide an interface for multi-finger mouse emulation. In other embodiments, the application program 912 is executed by one or more different processors, including a processor included in a multi-touch input device.

The CPU 930 communicates with the system memory 910 via the memory bridge 905, which may be, e.g., a Northbridge device or subsystem. System memory 910 is configured to store application programs, as well as data used by or generated by the CPU 930. System memory 910 is coupled to the memory bridge 905 via a system memory bus 950. The memory bridge 905 is coupled to the GPU 934 via a GPU system bus 952. The GPU system bus 952 may comprise any technically feasible data interconnect, such as the well-known personal computer interconnect (PCI) express bus. The memory bridge 905 is also coupled to the device bridge 942 using an interconnect system such as PCI. The GPU 934 conventionally incorporates real time image rendering means for rendering both three-dimensional (3D) and two-dimensional (2D) images. The GPU 934 delivers pixel data to display device 936, which may comprise a conventional CRT or LCD display. The GPU 934 is coupled to the GPU memory 920 using a GPU memory bus 954. The GPU memory 920 may be configured to store data used by or generated by the GPU 934. Data stored within the GPU memory 920 passes through the GPU 934 and the memory bridge 905 when accessed by the CPU 930. In some embodiments, the integrated circuit implementing the CPU 930 may incorporate additional functional blocks, such as the memory bridge 905 and the device bridge 942. In alternative embodiments, the integrated circuit implementing the GPU 934 may incorporate additional functional blocks, such as the memory bridge 905 and the device bridge 942.

The device bridge 942 is coupled to a hard drive 940, a network interface 944, and input devices 946. The hard drive 940 provides mass storage of programs and data. The network interface 944 provides network connectivity to other computers using a local area network (LAN) interface using any suitable technology, such as Ethernet. The input devices 946 provide user input. Other components (not explicitly shown), including USB or other port connections, CD drives, DVD drives, film recording devices, and the like, may also be connected to I/O bridge 907. Communication paths interconnecting the various components in FIG. 9 may be implemented using any suitable protocols, such as PCI (Peripheral Component Interconnect), PCI Express (PCI-E), AGP (Accelerated Graphics Port), HyperTransport, Quick Path Interconnect, or any other bus or point-to-point communication protocol(s), and connections between different devices may use different protocols as is known in the art.

In sum, embodiments of the invention provide techniques for detecting chords when a user places one or more fingers into contact with a multi-touch surface. A lift-and-stroke technique involves placing all five fingers of a hand into contact with the multi-touch surface so that a finger map can be established. One or more fingers are then lifted from the multi-touch surface so that a chord can be determined by analyzing the finger map and the one or more fingers that are no longer in contact with the multi-touch surface. A camera system may also be used to detect the chord. The camera system may involve one or more cameras that track the movement of a user's hand and fingers across the multi-touch surface. A processor may then analyze the images captured by the one or more cameras to determine which chord is established by the user. In addition, embodiments of the invention provide techniques for integrating the chords into directional movement gestures and using the gestures to control system functionality. In particular, some embodiments allow application menus, such as single level and nested marking menus, to be controlled using chords and directional movement chording gestures.

One advantage of embodiments of the invention is that the input capabilities of the multi-touch surface are significantly expanded as a result of the chords that are detectable by the multi-touch surface through the above techniques. Another advantage is that chording gestures create additional input functionality that is associated with each chord. Yet another advantage is that marking menus allow the user of the multi-touch surface to easily and conveniently view and interact with available features provided by the multi-touch surface through use of chords and chording gestures.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A method for interacting with a multi-touch surface to perform an operation, the method comprising:
    determining that five fingers are in contact with the multi-touch surface;
    detecting that one or more of the five fingers have been lifted away from the multi-touch surface;
    after the one or more of the five fingers have been lifted away from the multi-touch surface, determining that at least one finger of the five fingers is remaining in contact with the multi-touch surface;
    identifying a first chord that corresponds to the one or more of the five fingers being lifted away from the multi-touch surface and the at least one finger remaining in contact with the multi-touch surface;
    in response to identifying the first chord, performing a first operation associated with the first chord.

2. The method of claim 1, wherein the step of identifying the first chord comprises:
    capturing one or more images of the at least one finger remaining in contact with the multi-touch surface;
    determining a bounding box within the one or more images that encloses the at least one finger remaining first plurality of fingers that is in contact with the multi-touch surface; and
    analyzing the bounding box to identify the first chord associated with the at least one finger remaining in contact with the multi-touch surface.

3. The method of claim 2, wherein the one or more images are captured from beneath the multi-touch surface.

4. The method of claim 1, wherein performing the first operation comprises displaying a first plurality of user interface elements associated with the first chord on the multi-touch surface.

5. The method of claim 4, wherein the first plurality of user interface elements comprises a radial marking menu.

6. The method of claim 5, wherein the radial marking menu is offset by a fixed distance from a location at which the at least one finger is in contact with the multi-touch surface.

7. The method of claim 4, further comprising receiving a first selection of a first user interface element included in the first plurality of user interface elements, and based on receiving the first selection, executing a first application command associated with the first user interface element.

8. The method of claim 7, wherein receiving the first selection of the first user interface element comprises detecting a chording gesture caused by the at least one finger sliding along the multi-touch surface.

9. The method of claim 7, further comprising:
    receiving a second selection of a second user interface element included in the first plurality of user interface elements; and
    based on receiving the second selection of the second user interface element, displaying a nested marking menu comprising a second plurality of user interface elements.

10. A non-transitory computer-readable storage medium storing instructions that, when executed by a processor, cause a computing device to interact with a multi-touch surface to perform an operation, by performing the steps of:
    determining that five fingers are in contact with the multi-touch surface;
    detecting that one or more of the five fingers have been lifted away from the multi-touch surface;
    after the one or more of the five fingers have been lifted away from the multi-touch surface, determining that at least one finger of the five fingers is remaining in contact with the multi-touch surface;
    identifying a first chord that corresponds to the one or more of the five fingers being lifted away from the multi-touch surface and the at least one finger remaining in contact with the multi-touch surface;
    in response to identifying the first chord, performing a first operation associated with the first chord.

11. The non-transitory computer-readable storage medium of claim 10, wherein performing the first operation comprises displaying a first plurality of user interface elements associated with the first chord on the multi-touch surface.

12. The non-transitory computer-readable storage medium of claim 11, wherein the first plurality of user interface elements comprises a radial marking menu.

13. The non-transitory computer-readable storage medium of claim 12, wherein the radial marking menu is offset by a fixed distance from a location at which the at least one finger is in contact with the multi-touch surface.

14. The non-transitory computer-readable storage medium of claim 11, further comprising the steps of receiving a first selection of a first user interface element included in the first plurality of user interface elements, and based on receiving the first selection, executing a first application command associated with the first user interface element.

15. The non-transitory computer-readable storage medium of claim 14, wherein the step of receiving the first selection of the first user interface element comprises detecting a chording gesture caused by the at least one finger sliding along the multi-touch surface.

16. The non-transitory computer-readable storage medium of claim 10, wherein the step of identifying the first chord comprises:
    capturing one or more images of the at least one finger remaining first plurality of in contact with the multi-touch surface;
    determining a bounding box within the one or more images that encloses the at least one finger remaining in contact with the multi-touch surface; and
    analyzing the bounding box to identify the first chord associated with the at least one finger remaining in contact with the multi-touch surface.

17. The non-transitory computer-readable storage medium of claim 16, wherein the one or more images are captured from beneath the multi-touch surface.

18. The non-transitory computer-readable storage medium of claim 10, further comprising the steps of:
    receiving a third selection of a third user interface element included in the first plurality of user interface elements; and based on receiving the third selection of the third user interface element, displaying a nested marking menu comprising a third plurality of user interface elements.

19. The non-transitory computer-readable storage medium of claim 10, further comprising, after determining that the five fingers are in contact with the multi-touch surface, generating a finger coordinate map that comprises finger coordinates for each of the five fingers, wherein determining that the at least one finger is remaining in contact with the multi-touch surface is performed based on the finger coordinate map.

20. A computer system, comprising:
   a processor; and
   a memory storing instructions that when executed by the processor cause the computer system to interact with a multi-touch surface to perform an operation, by performing the steps of:
      determining that five fingers are in contact with the multi-touch surface;
      detecting that one or more of the five fingers have been lifted away from the multi-touch surface;
      after the one or more of the five fingers have been lifted away from the multi-touch surface, determining that at least one finger of the five fingers is remaining in contact with the multi-touch surface;
      identifying a first chord that corresponds to the one or more of the five fingers being lifted away from the multi-touch surface and the at least one finger remaining in contact with the multi-touch surface;
      in response to identifying the first chord, performing a first operation associated with the first chord.

21. The system of claim 20, wherein performing the first operation comprises displaying a first plurality of user interface elements associated with the first chord on the multi-touch surface, and further comprising the steps of receiving a first selection of a first user interface element included in the first plurality of user interface elements, and based on receiving the first selection, executing a first application command associated with the first user interface element.

* * * * *